United States Patent [19]

Honjo et al.

[11] Patent Number: 4,775,139
[45] Date of Patent: Oct. 4, 1988

[54] SHEET HANDLING DEVICE

[75] Inventors: Takeshi Honjo, Kawasaki; Naomi Takahata, Yokohama, both of Japan

[73] Assignee: Canon Kabushiki Kaisha, Tokyo, Japan

[21] Appl. No.: 858,855

[22] Filed: Apr. 30, 1986

Related U.S. Application Data

[63] Continuation of Ser. No. 543,117, Oct. 18, 1983, abandoned.

[30] Foreign Application Priority Data

| Oct. 25, 1982 | [JP] | Japan | 57-187253 |
| Oct. 25, 1982 | [JP] | Japan | 57-187254 |
| Oct. 25, 1982 | [JP] | Japan | 57-187255 |
| Oct. 25, 1982 | [JP] | Japan | 57-187256 |
| Oct. 25, 1982 | [JP] | Japan | 57-187257 |
| Oct. 25, 1982 | [JP] | Japan | 57-187258 |
| Oct. 25, 1982 | [JP] | Japan | 57-187259 |
| Oct. 25, 1982 | [JP] | Japan | 57-187260 |

[51] Int. Cl.$^4$ .......................... B65H 1/04; B65H 5/02
[52] U.S. Cl. ...................................... 271/10; 271/111; 271/259; 271/265
[58] Field of Search ............... 271/10, 4, 9, 110, 111, 271/34, 35, 162, 164, 122, 258, 259, 275, 265, 25

[56] References Cited

U.S. PATENT DOCUMENTS

| 3,279,786 | 10/1966 | Fliegner et al. | 271/35 |
| 4,114,870 | 9/1978 | Di Blasio | 271/35 |
| 4,420,149 | 12/1983 | Schultes et al. | 271/10 |

FOREIGN PATENT DOCUMENTS 2086860  5/1982  United Kingdom ........... 271/4

Primary Examiner—F. J. Bartuska
Attorney, Agent, or Firm—Fitzpatrick, Cella, Harper & Scinto

[57] ABSTRACT

A sheet handling device has sheet feeder for feeding a sheet to a predetermined position and selector for selecting a first mode or a second mode of the sheet feeder. In the first mode, a separation unit for separating sheets one by one and a feed unit for feeding the sheet separated by the separation unit and set at an entry are operated jointly, and in the second mode, the feed unit is operated singly.

19 Claims, 15 Drawing Sheets

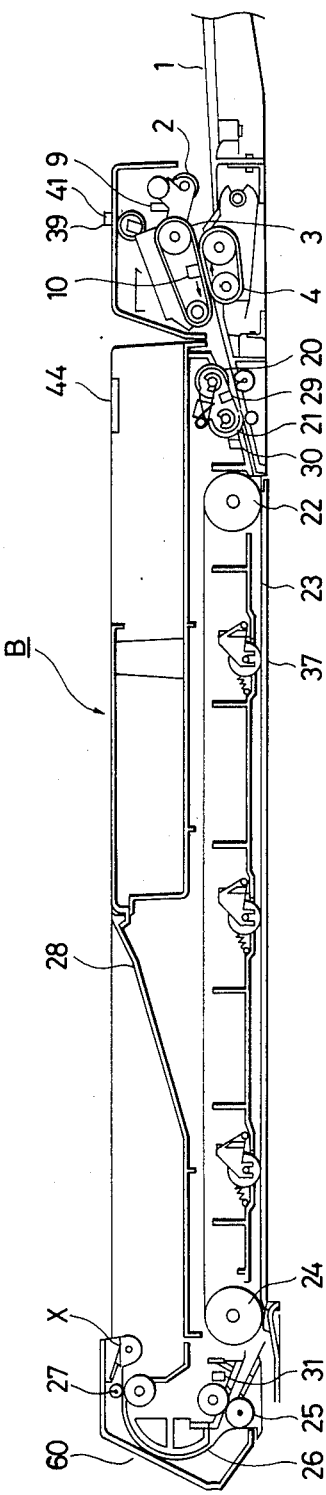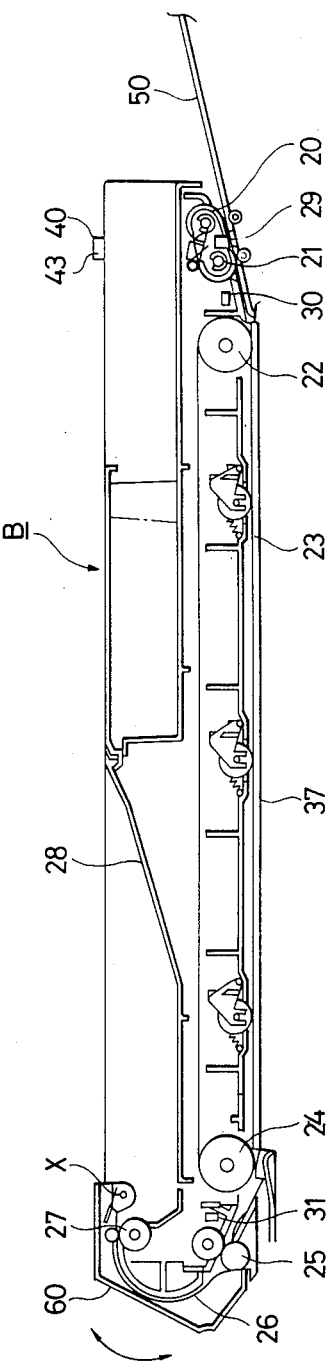
FIG. 2-1
FIG. 2-2

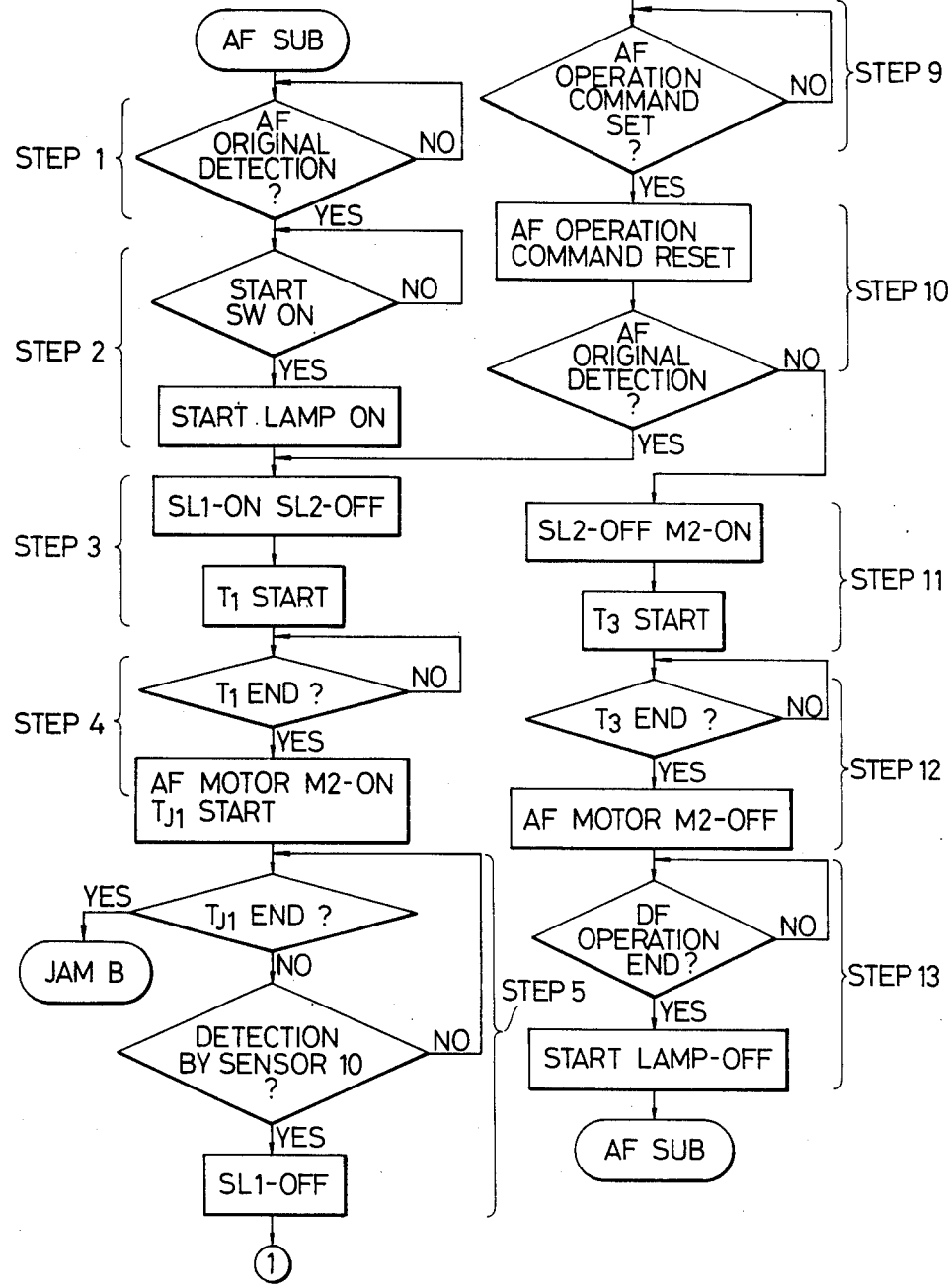

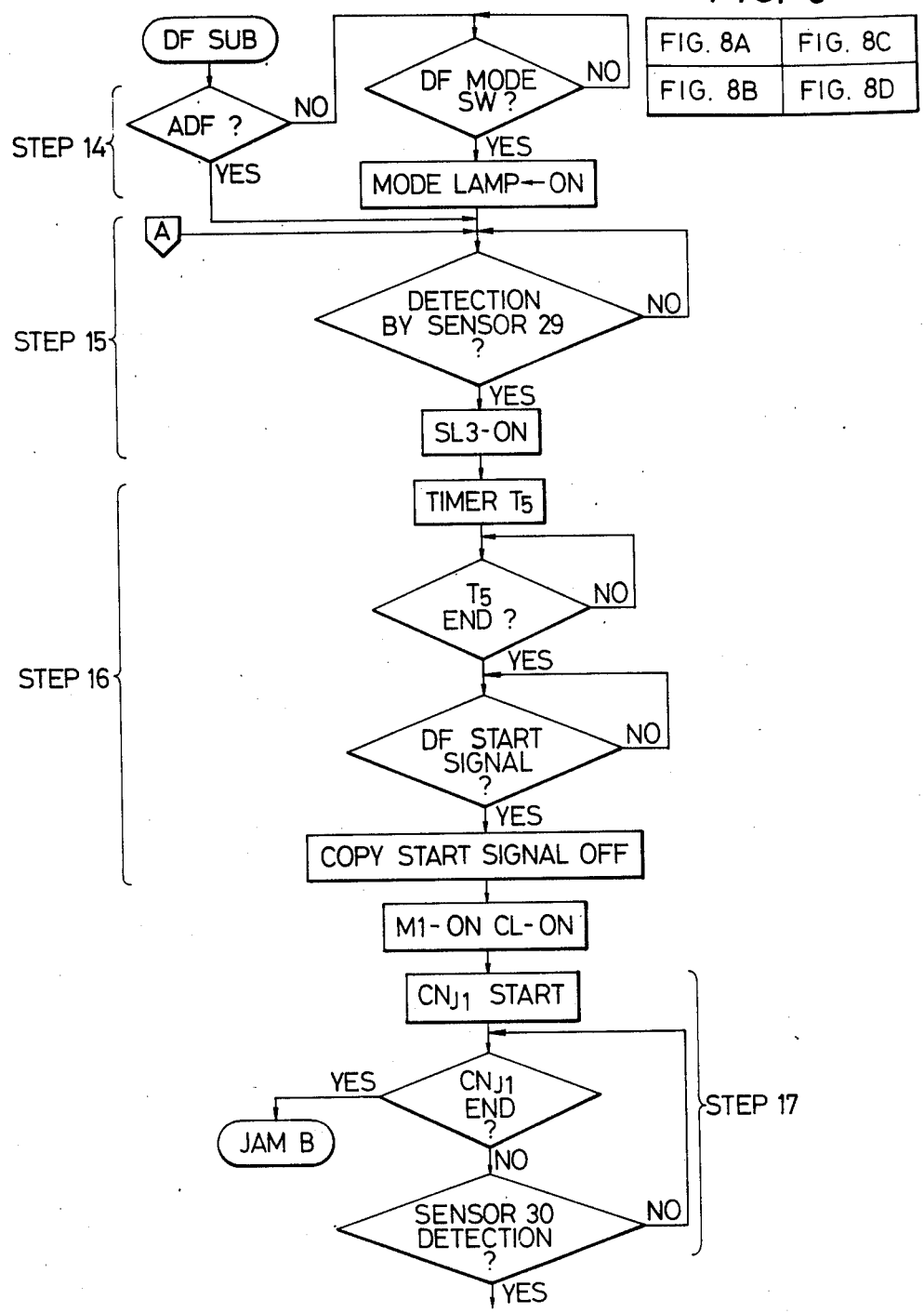

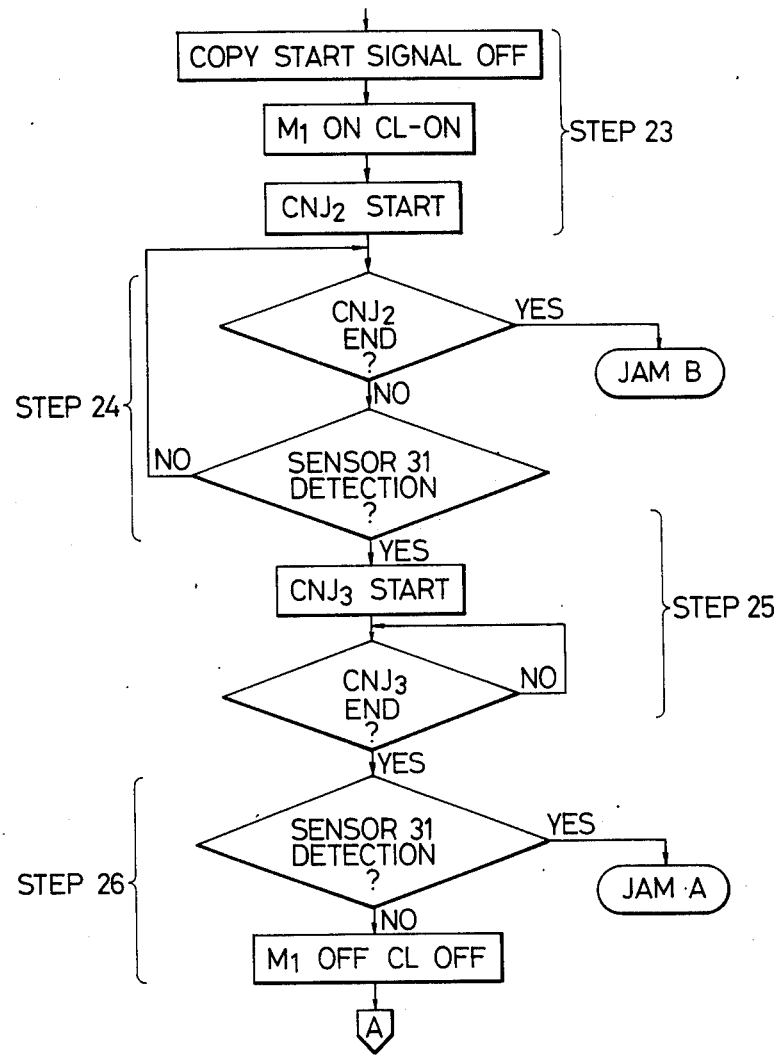

SHEET HANDLING DEVICE

This application is a continuation, of application Ser. No. 543,117 filed Oct. 18, 1983 now abandoned.

BACKGROUND OF THE INVENTION

1. Field of the Invention

The present invention relates to a sheet handling device for feeding a sheet to a predetermined position.

2. Description of the Prior Art

In an image forming apparatus such as a copying machine, a sheet handling device for feeding an original sheet to an exposure position is usually used.

Such a sheet handling device may be a document feeder (DF) which feeds an original sheet manually set by an operator to an entry tray one by one or an automatic document feeder (ADF) which automatically feeds sheets, one at a time, which are set by the operator to a document mount. Those document feeders are in union with the copying machine. Accordingly, when it is desired to change the DF to the ADF, it is necessary to remove the DF and attach the ADF.

The ADF comprises a mechanism (AF unit) for automatically separating the original sheets one by one which are set by the operator on the document mount and a mechanism (DF unit) for feeding the separated original sheet to the exposure position.

In order to assure the separation ability in the AF unit, it is necessary to lower a feed speed of the original sheets. Thus, where the AF unit and the DF unit are driven by the same drive system, the drive speed is determined by the AF unit. As a result, an original exchange time increases, which results in a low performance of the original sheet handling device.

Further, since the separation of the next original sheet is started when the current original sheet is ejected from the DF unit after the copy operation, the original exchange time is too long and the performance of the original sheet handling device is lowered.

In a certain AF unit, the original sheets mounted on the angled original mount abut against ends of two separation belts by their gravity and one of the belts is moved in the direction of feed of the original sheet while the other belt is moved in the return direction so that one original sheet is separated from a number of original sheets. However, the separation of thin original sheets is very difficult to attain because of strong attractive force between the original sheets.

Further, in such an original sheet handling device, the original sheet may be jammed in the device in the course of feeding to the exposure positon due to skew or slip. Thus, means for informing the jam to an operator by an alarm lamp has been proposed. When the jam occurs, the operator takes out the jammed original sheet form the device and resets an output of an original sheet sensor to a no original sheet state. in such an arrangement, even if a motor is stopped when the jam occurs, the jammed original sheet is moved by an inertia and the sensor no longer senses the jam and it may be reset in spite of the jam condition.

In such a device, the original sheet taken out by the opertor can be stacked on the original sheets mounted on the document mount and the feeding can be started again. However, when the jammed original sheet is stacked on the original sheets and the feeding is started again, the original sheet is easily skewed and jammed again.

In such an original sheet handling device, where a plurality of paper ejection paths for ejecting the original sheet after the exposure operation are provided, means for checking whether the ejection was properly effected or not is required for each ejection path. When the ejection paths are of different lengths, a jam timer is to be arranged in front of each ejection path to check proper ejection accordingly, the device is very complex.

SUMMARY OF THE INVENTION

The present invention is directed to a sheet handling device which overcomes the foregoing difficulties and disadvantages. Thus, according to the present concept, there is provided a sheet handling device which includes stack means for stacking sheets to be fed, detection means for detecting the presence or absence of sheets in the stack means and feed means for feeding sheets in the stack means to a predetermined position. The device also includes misfeed detection means for detecting a misfeed of a sheet in the feed path in the feed means and control means for stopping the feed means in response to the detection of misfeed of a sheet by the misfeed detection means and permitting the feed means to restart upon the detection of the absence of a sheet in the stack means by the sheet detection means after detection of misfeed of a sheet by the misfeed detection means.

More specifically, the device includes separation means for separating original documents one at a time at a first speed, feed means for feeding an original document separated by the separation means to a predetermined position at a second speed that is greater than the first speed, detection means for detecting an original document in the feed means and positioned further upstream than the predetermined position with respect to the transporting direction of the original document, and control means for controlling the separation means in accordance with the output of the detection means to initiate the separating operation for the successive original document upon detection of a predetermined portion of the original document by the detection means. The predetermined portion may be the trailing edge of the original document.

The device of the present invention is more reliable than those heretofore known to us, operates more rapidly, prevents malfunction when misfeed is detected and also prevents the recurrence of misfeed after a misfeed is detected.

BRIEF DESCRIPTION OF THE DRAWINGS

FIG. 2-1 is a sectional view showing a construction in an ADF mode.

FIG. 2—2 is a sectional view showing a construction in a DF mode.

DETAILED DESCRIPTION OF THE PREFERRED EMBODIMENTS

Figure 1:
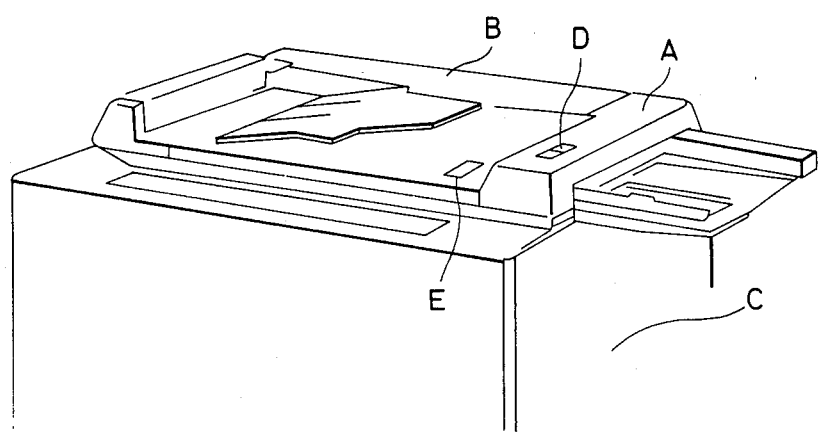
FIG. 1 is a perspective view of a sheet handling device of the present invention.

FIG. 1 is a perspective view of one embodiment of the present invention. In FIG. 1, A denotes a document feeder (AF) which separates and feeds one of a plurality of original documents, B denotes a document setter (DF) for feeding the original document to an exposure position, and C denotes a copying machine. The AF unit and the DF unit are separable and they are operable in either an ADF mode in which the AF unit and the DF unit are connected to feed the original documents on a DF mode in which the AF unit is removed and the original documents are fed only by the DF unit. D and E denote control displays each having a start key or a mode key and a jam indication lamp for the ADF mode and the DF mode, respectively. In the ADF mode, the control display E is covered so that it is not operated.

Figure 3:
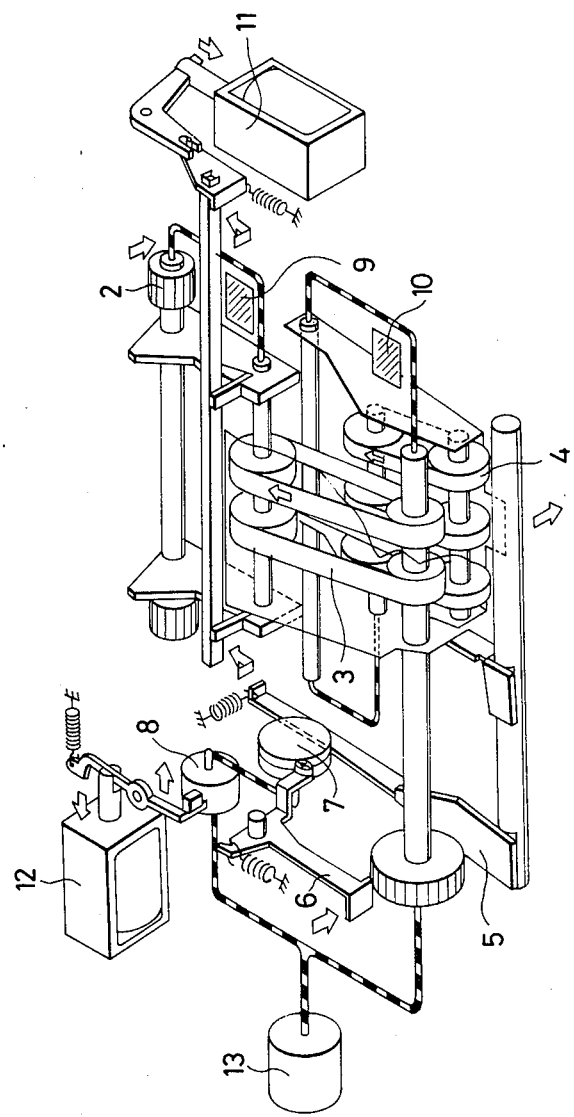
FIG. 3 is a perspective view showing a construction of an AF unit.
Figure 4:
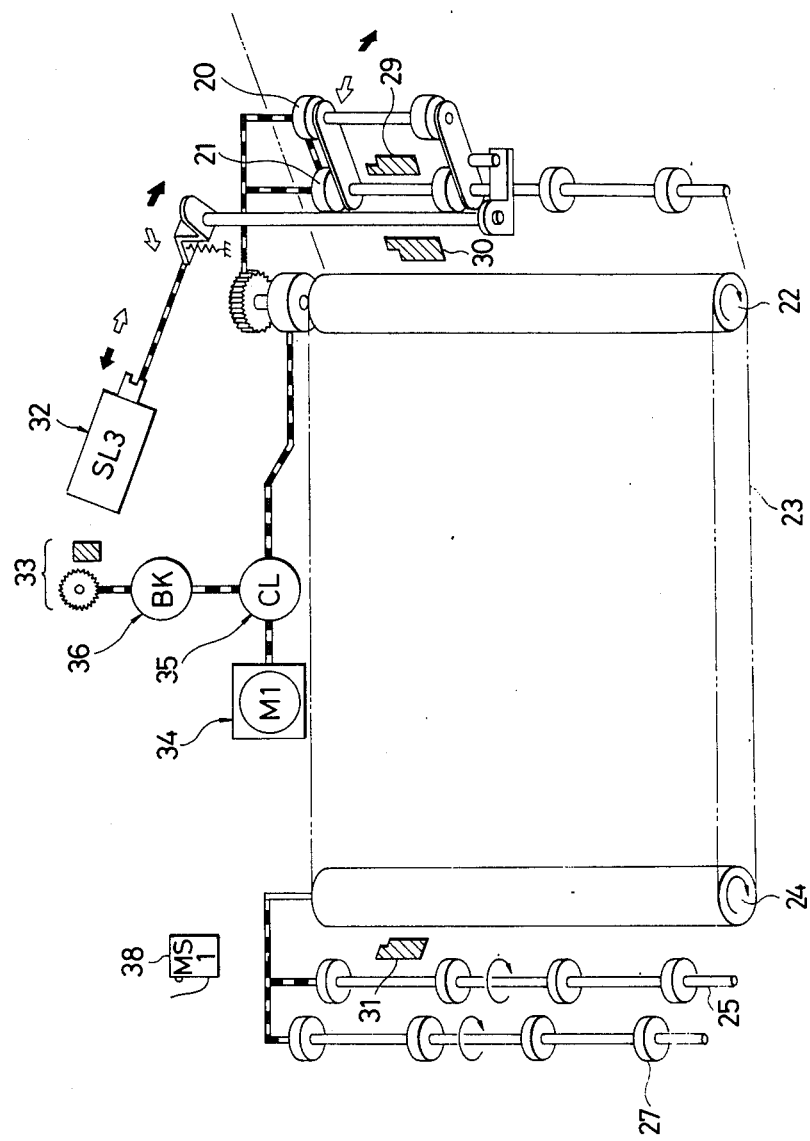
FIG. 4 is a perspective view showing a construction of a DF unit.

FIGS. 2-1 and 2—2 show sectional views in the ADF mode and the DF mode, respectively, FIG. 3 shows a perspective view of the AF unit, and FIG. 4 shows a perspective view of the DF unit.

The construction in the ADF mode is first explained. In FIGS. 2-1 and 3, numeral 1 denotes a horizontally arranged original document stack tray on which original documents are stacked with copying side faced down. Numeral 2 denotes a pickup roller which is moved down upon energization of a pickup solenoid (SL1) 11 to pickup the original document on the document stack tray 1. When an AF drive motor (M2) 13 is driven, the clockwise rotation is transmitted to the pickup roller 2 through a separation belt (upper) 3. The separation belt (upper) 3 and a separation belt (lower) 4 are held with a clearance therebetween to feed one sheet of original document. When the AF drive motor 13 (M2) is driven, the belts 3 and 4 are rotated in the directions of arrows to separate and feed one sheet of the original documents. As the original document is fed into the separation belts 3 and 4, the solenoid 11 is deenergized and the pickup roller 2 is moved up. When a belt open solenoid (SL2) 12 is energized during the rotation of the motor 13, a half-revolution control ring 8 is rotated one-half revolution and a cam 7 is rotated. Thus, a clutch pawl 6 is moved down in the direction of arrow to disconnect the transmission of the drive force of the motor 13 to the separation belts 3 and 4, and a release shaft arm 5 pushes down the separation belt (lower) 4 to create a clearance between the separation belts 3 and 4. When the belt open solenoid 12 is subsequently deenergized while the motor 13 is rotated, the half revolution control ring 8 is rotated one-half revolution to return the cam 7 to the original position. Thus, the clutch pawl 6 is lifted to transmit the rotation of the motor 13 to the separation belts 3 and 4 and the release shaft arm 5 is lifted to move up the separation belt (lower) 4 so that the clearance between the separation belts 3 and 4 is returned to the original state.

A drive system of the AF unit is shared by the pickup roller 2 and the separation belts 3 and 4, and the rotational force of the drive motor (M2) 13 is transmitted to the respective elements. Numeral 9 denotes an AF original document sensor (S1) for detecting setting of the original document on the document stack tray 1, and numeral 10 denotes a timing sensor (S2) for detecting when the original document enters into the separation belts.

The DF unit is now explained. In FIGS. 2-1 and 4, numeral 20 denotes a roller for pressing the original document fed from the AF unit. It is lowered to press the original document when an original document press solenoid (SL3) 32 is energized. Numeral 21 denotes a feed roller which feeds the original document fed from the AF unit. A belt 23 is spanned between a drive roller 22 and a turn roller 24 and it is pressed to an original document platen glass 37 to feed the original document by a frictional force. An ejection roller (1) 25 ejects the original document on the original document platen glass 32 after the copy operation and the ejected original document is ejected along a turn 26 and stacked on an ejection tray 28 by an ejection roller (2) 27. Numeral 29 denotes a DF original document sensor (S3) for detecting the original document fed from the AF unit, numeral 30 denotes an entry sensor (S4) which detects a leading edge and a trailing edge of the original document, and numeral 31 denotes an ejection sensor (S5) which detects the ejection of the original document. A drive system of the DF unit is shared by the press roller 20, the feed roller 21, the belt drive roller 22, the turn roller 24, the ejection roller (1) 25 and the ejection roller (2) 26. The circumferential speeds thereof are equal and the rotation of the drive motor (M1) 34 is transmitted to the respective elements through a clutch (CL) 35. A brake (BK) 36 is energized when the original document is to be set at a predetermined position on the original document platen glass 37. The operation is controlled by a clock generator 33 which generates a clock in synchronism with the rotation of the drive motor 34 (M1).

The feed speed of the AF unit is slower than the feed speed of the DF unit to attain better separation of the original document.

Numeral 39 denotes a start switch located at the control display D (FIG. 1). When it is depressed, an internal lamp 41 is lit and the feed of the original document is started. Numeral 44 denotes a cover for covering the control display E in order to prevent the control display E from being operated by an operator in the ADF mode.

A cover 60 of the turn 26 is rotatable around a shaft X. When the cover 60 is opened, the original document can be ejected leftward from the ejection roller 25.

Because two ejection paths are provided in the present embodiment, the ejection sensor 31 is located immediately upstream of the branch point so that the sensor can check the ejection whichever ejection path may be selected.

The DF unit can be opened and close separately from the AF unit, and a DF door switch (to be described later) comprising a microswitch is provided to detect the open or close position.

The construction of the device in the DF mode is shown in FIG. 2—2. The like numerals to those in FIGS. 2-1 denote the like elements, and numeral 50 denotes an entry tray on which the original documents are stacked one by one. Numeral 40 denotes a DF mode key in the control display E (FIG. 1). When it is depressed, the DE mode is selected and an internal lamp 43 is lit.

The operation of the above construction is now explained. The ADF mode is first described. When the original documents are stacked on the original document stack tray 1, the AF original document sensor 9 senses the original document. When the ADF start switch 39 is turned on, the lamp 41 is lit and the solenoid 11 is energized so that the pickup roller 2 is descended. A predetermined time after the energization of the solenoid 11, the AF motor 13 is rotated and the topmost one of the stacked original documents starts to be fed. When the leading edge of the original document fed between the separation belts 3 and 4 is sensed by the AF timing sensor 10, the solenoid 11 is deenergized and the pickup roller 2 is moved up. The original document is fed from the AF unit to the DF unit. When the leading edge of the original document is detected by the DF original document sensor 29, the solenoid 12 in the AF unit is energized to push down the separation belt (lower) 4. The separation belts 3 and 4 stop the operation. A predetermined time after the energization of the solenoid 12, the AF motor 13 is stopped and the operation of the AF unit is stopped.

In the DF unit, when the DF original sensor 29 detects the leading edge of the original document, the solenoid 32 is energized and the press roller 20 is moved down to press the original document. When the DF motor and the clutch 35 are activated, the DF unit press roller 20, the feed roller 21, the belt drive roller 22, the turn roller 24 and the ejection rollers 25 and 26 are rotated. Thus, the original document starts to be fed at a faster speed than that in the AF unit. When the original document passes through the feed roller 21, the leading edge of the original document is detected by the entry sensor 30 and clock pulses generated by the clock generator 33 are counted from this time point. The solenoid 32 is deenergized and the press roller 20 is moved up. The original document then enters into the space between the belt 23 and the original document platen glass 37 and it is fed by the belt 23. When the entry sensor 30 detects the trailing edge of the original document, the feed of the next original document is started if it is present in the AF unit. This original document is stopped at the position of the DF original document sensor 29. When the number of pulses generated by the clock generator 35 reaches a predetermined count, the DF motor 34 and the clutch 35 are deenergized and the brake 36 is energized. A copy start signal is sent to the copying machine to start the copy operation. The brake 36 is deenergized after a predetermined time period.

When the copy operation of the copying machine is completed, the DF motor 34 is rotated and the clutch 35 is energized so that the belt 23 starts to eject the original document. The original document is ejected to the ejection tray 28 by the ejection rollers 25 and 27.

If the original document to be copied next is not detected by the DF original document sensor 29, the DF motor 34 and the clutch 35 are deenergized a predetermined time after the detection of the leading edge of the original document by the ejection sensor 31. If the DF original document sensor 29 detects the original document to be copied next, the solenoid 32 is energized and the next original document is fed in the same procedure as described above simultaneously with the ejection of the current original document.

The operation in the DF mode is next described. When the DF mode switch 40 is turned on, the DF mode is selected and the internal lamp 43 is lit. The original documents are stacked on the entry tray 50 and inserted below the press roller 20. When the DF original document sensor 29 detects the original documents, the solenoid 32 is energized and the press roller 20 is descended. The original document is fed to the exposure position in the same procedure as described above and it is ejected after the exposure. When the DF original document sensor 29 denotes the original document a predetermined time after the ejection sensor 31 detects the leading edge of the original document, the original document is again fed.

Figure 5:
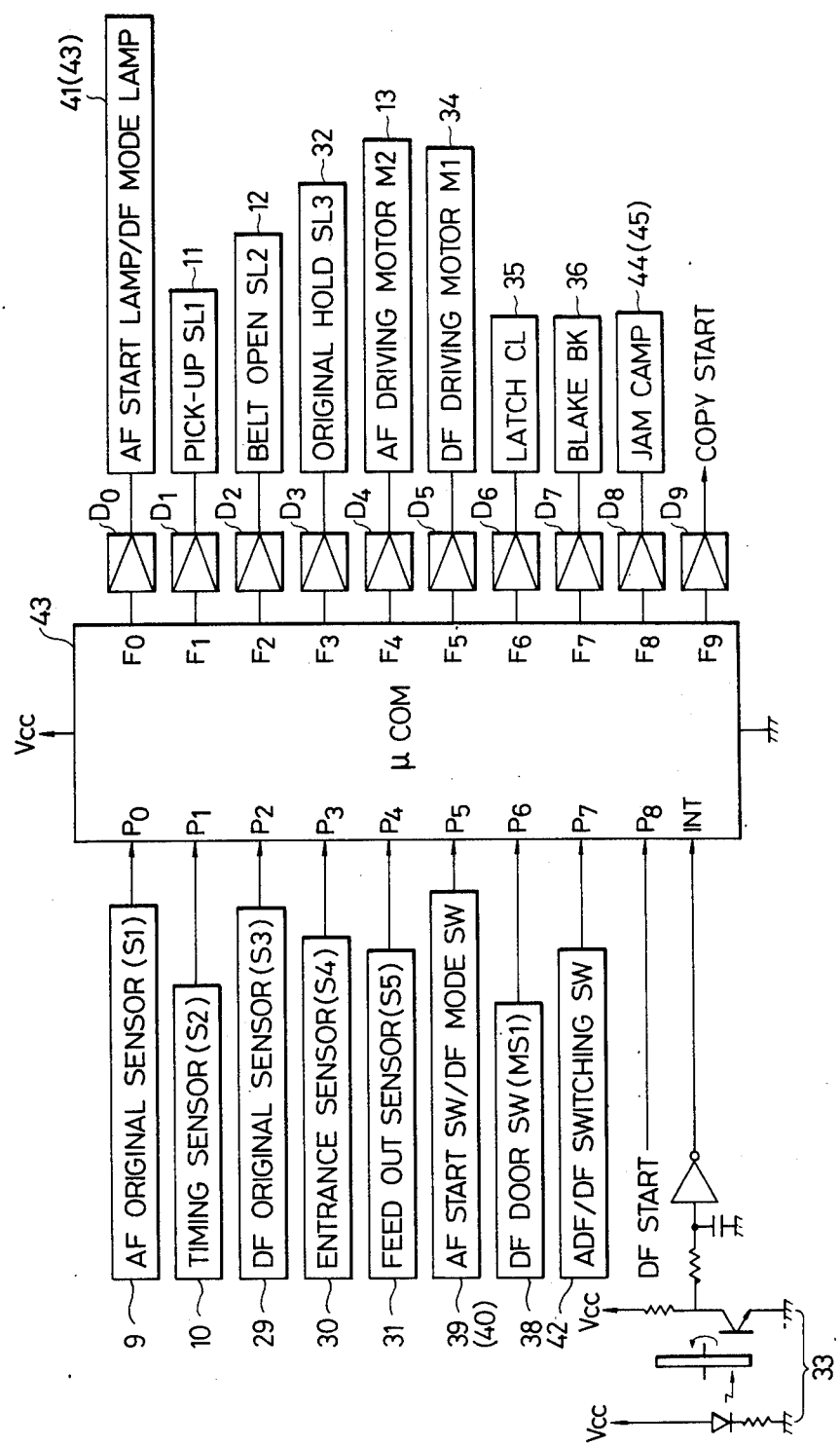
FIG. 5 is a block diagram of a control unit of the sheet handling device of the present invention.

FIG. 5 is a block diagram of a control circuit for performing the above operation. It primarily comprises a well-known one-chip microcomputer ($\mu$ COM) 43 having a ROM and a RAM. The pulse signal from the clock generator 33 generated when the DF motor 34 is rotated is shaped by a capacitor and it is applied to an interrupt terminal INT of the $\mu$ COM 43. The original document detection signals from the AF original document sensor ($S_1$) 9, the timing sensor ($S_2$) 10, the DF original document sensor ($S_3$) 29, the entry sensor ($S_4$) 30 and the ejection sensor ($S_5$) 31 are applied to input ports $P_0$–$P_4$. The signal from the ADF start switch 39 in the ADF mode and the signal from the DF mode switch 40 in the DF mode are applied to an input port $P_5$. A status detection signal from a microswitch (MS1) 38 which is actuated in accordance with the open and close state of the DF unit is applied to an input port $P_6$. A signal from a switch 42 which selects the DF mode or the ADF mode is applied to an input port $P_7$. The switch 42 is arranged on a printed circuit board on which the control circuit is mounted. A DF start signal DFSTART from the copying machine is applied to an input port $P_8$. This signal is produced when the last exposure for the copy operation in the copying machine is completed.

Ports $F_0$–$F_9$ are output ports. The port $F_0$ produces a signal to turn on the start lamp 41 in the ADF mode and the DF mode lamp 43 in the DF mode, through a driver $D_0$ in accordance with the input signal to the input port $P_5$. The ports $F_1$–$F_3$ produce drive control signals to energize the pickup solenoid 11, the belt open solenoid 12 and the original document press solenoid 32, respectively, through drivers $D_1$–$D_3$. The ports $F_4$–$F_7$ produce drive control signals to the AF drive motor ($M_2$) 13, the DF drive motor ($M_1$), the clutch 35 and the brake 36, respectively, through drivers $D_4$–$D_7$. The port $F_8$ produces a signal to turn on the jam indication lamp 44 or 45 in the control display D or E (FIG. 1), and the port $F_9$ produces a copy start signal COPYSTART to the copying machine, through drivers $D_8$ and $D_9$, respectively.

The read-in of those input signals and the turn-on and the turn-off of the loads are controlled by a program stored in the ROM of the $\mu$ COM 43.

Figure 8B:
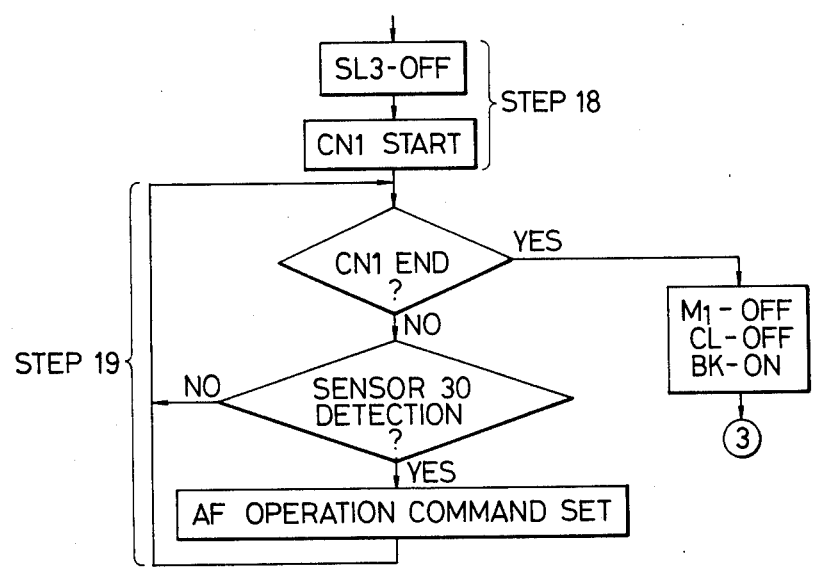
Figure 8C:
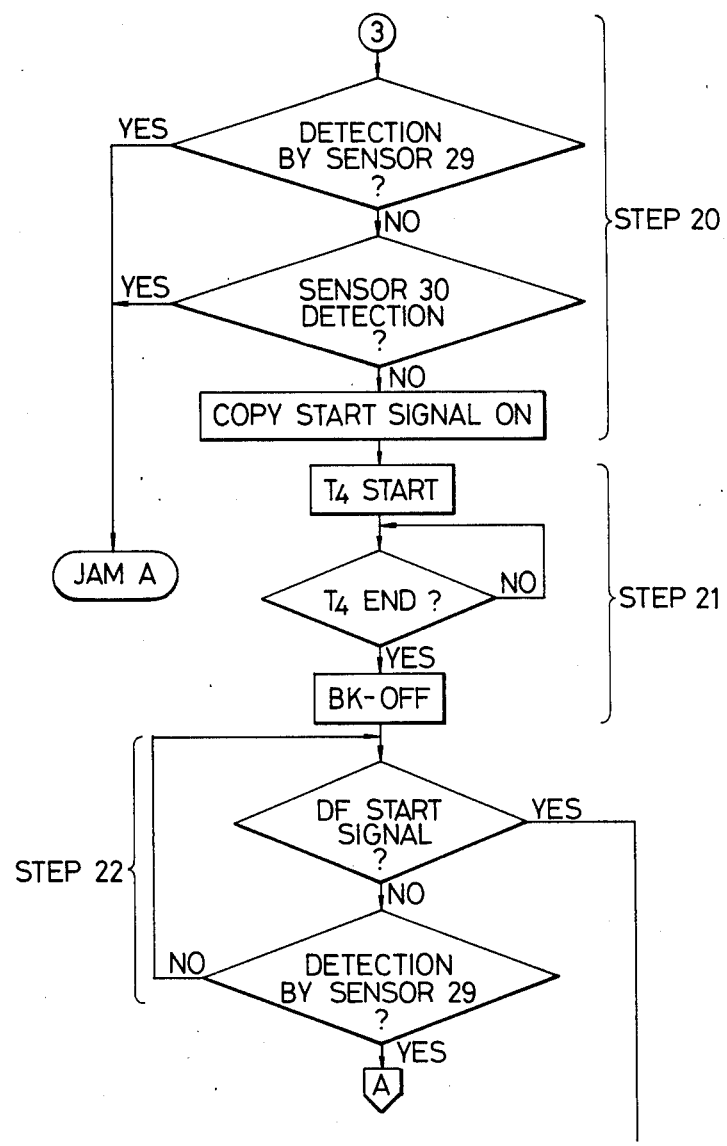
Figure 9:
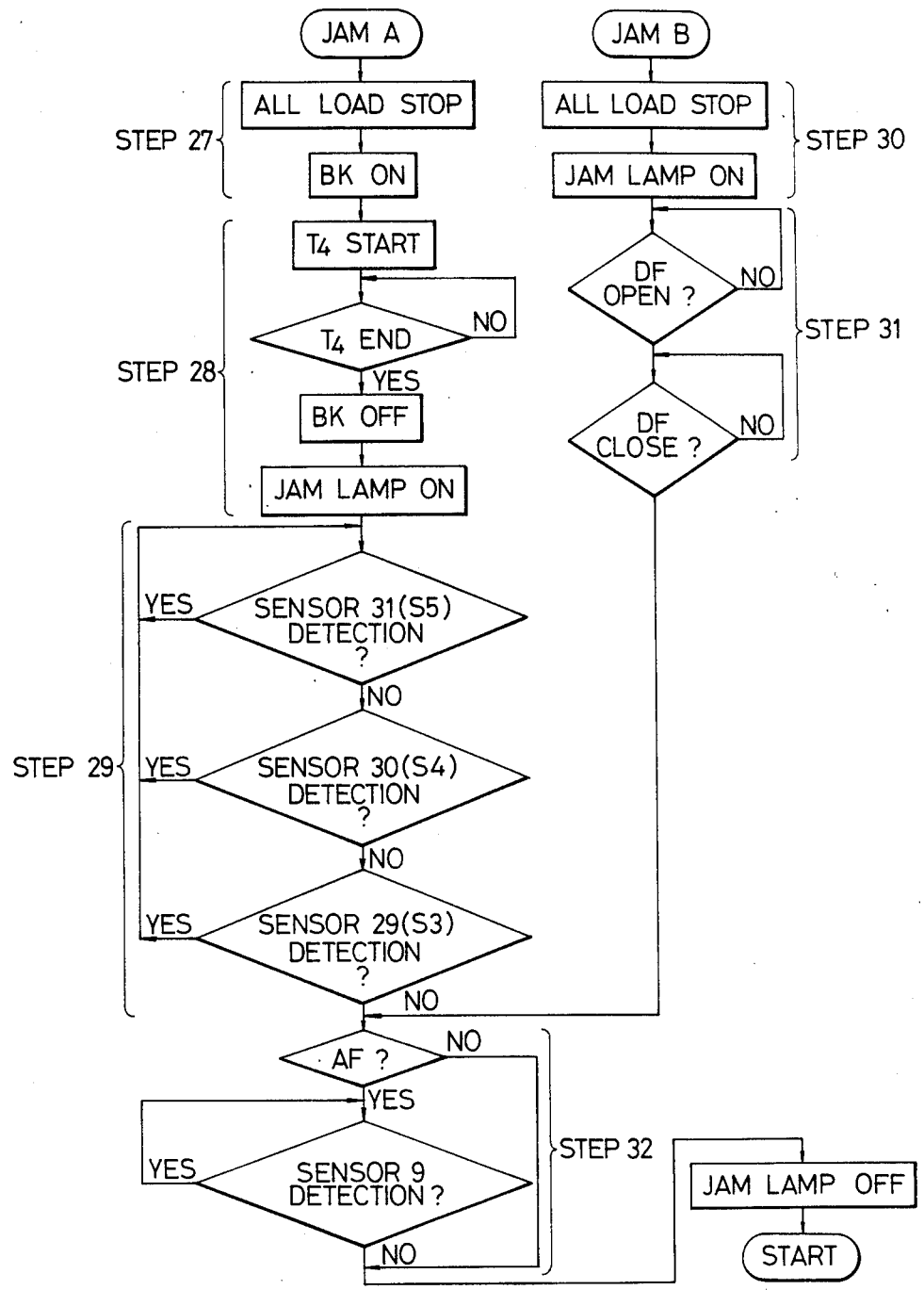
Figure 10:
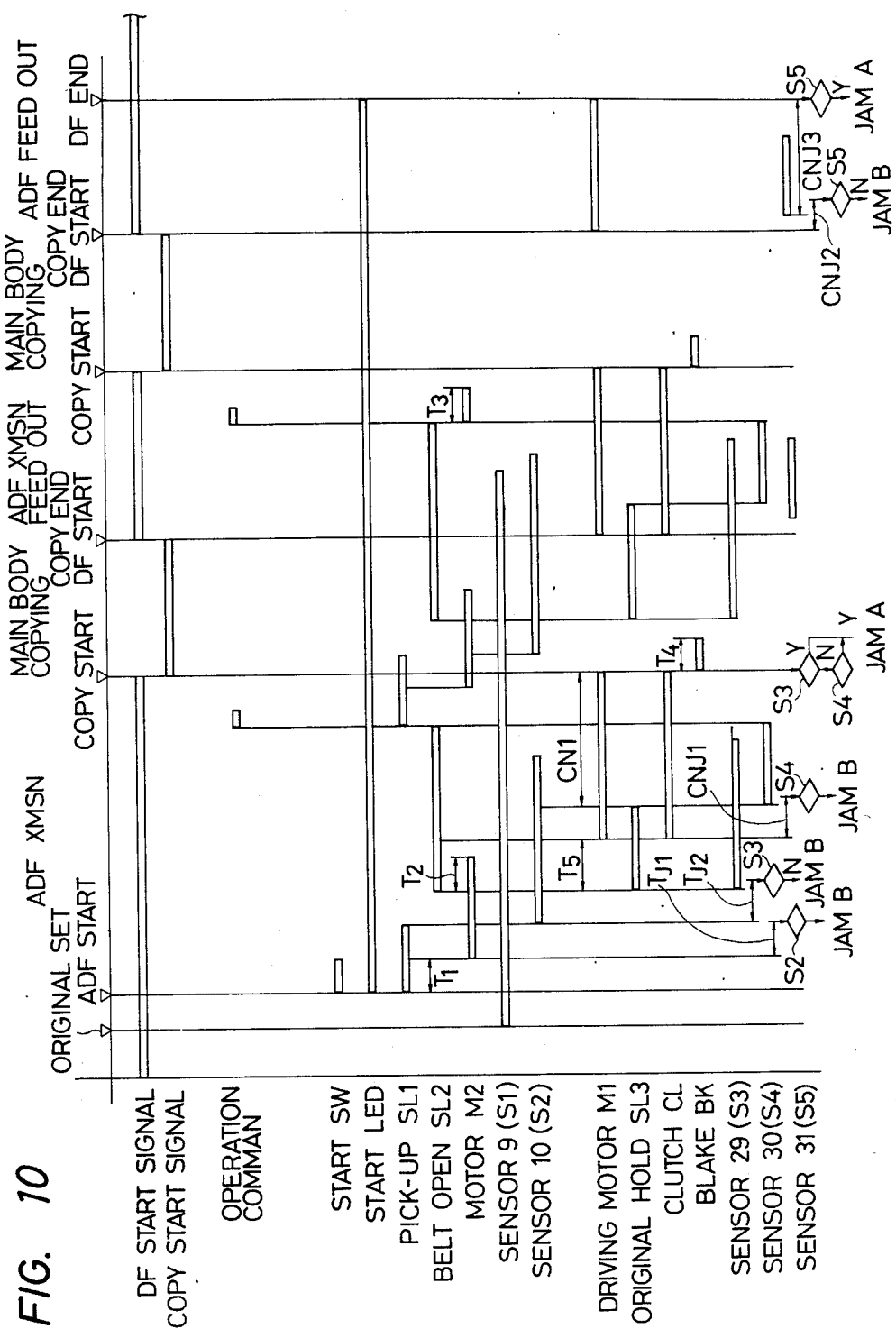
FIG. 10 is a timing chart in the ADF mode.
Figure 11:
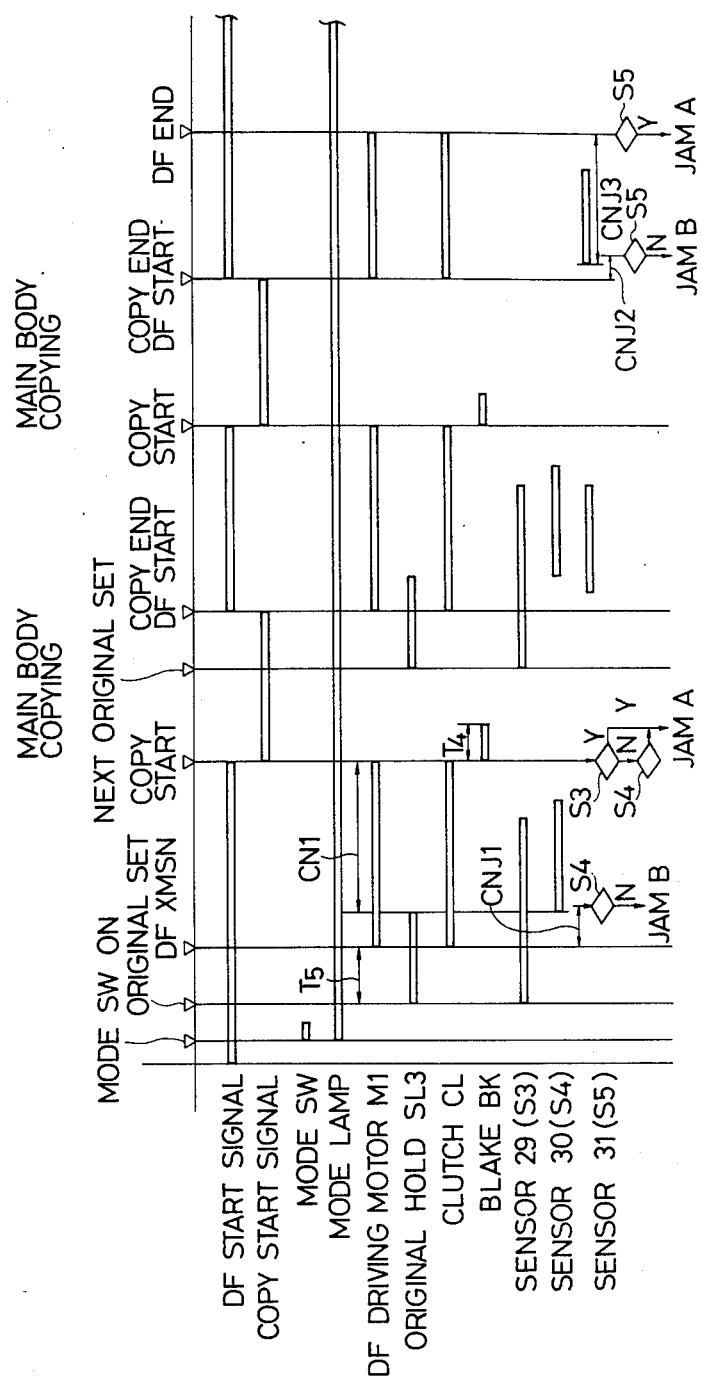
FIG. 11 is a timing chart in the DF mode.

FIGS. 6–9 show flow charts of the program, FIG. 10 shows a timing chart when two original documents are fed in the ADF mode and FIG. 11 shows a timing chart when two original documents are fed in the DF mode. The above operation is now explained in detail with reference to the flow charts.

Figure 6:
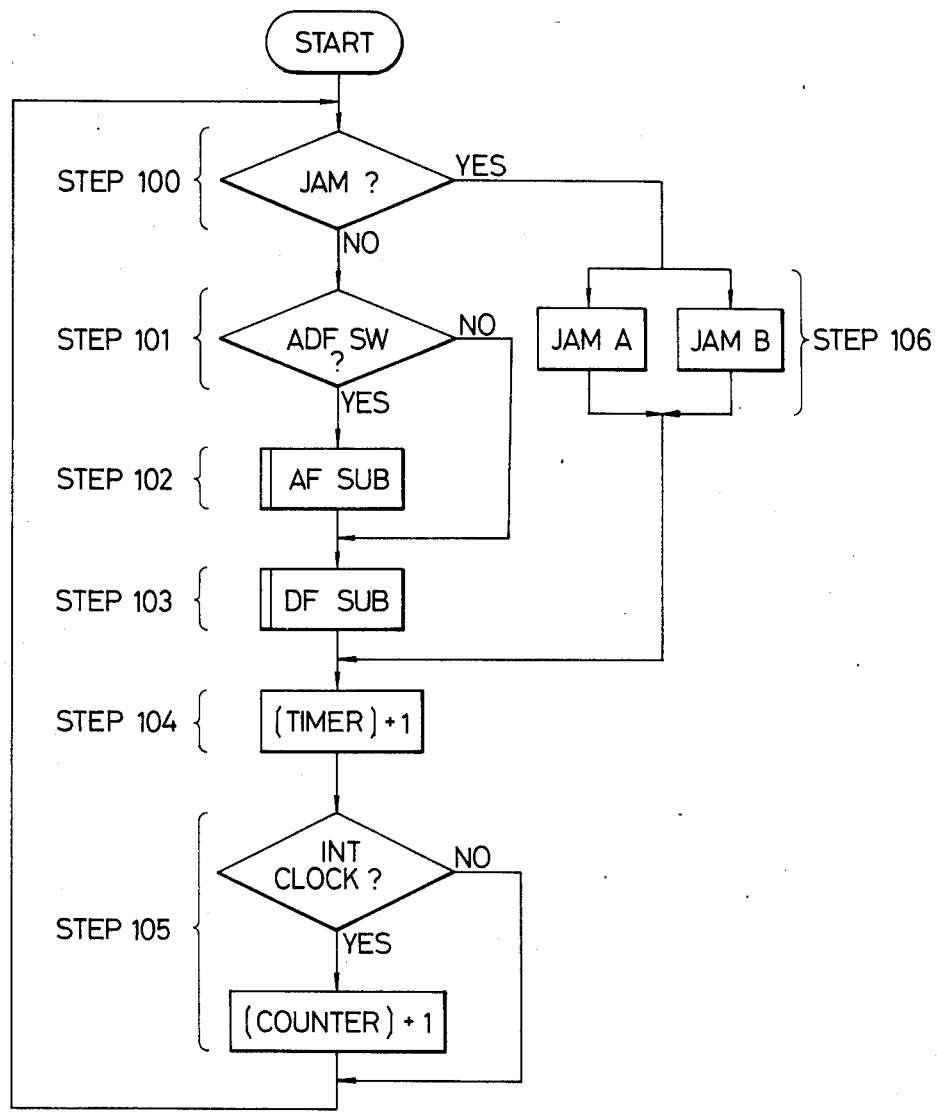
FIGS. 6–9 are flow charts of a program stored in a μCOM.
Figure 7B:
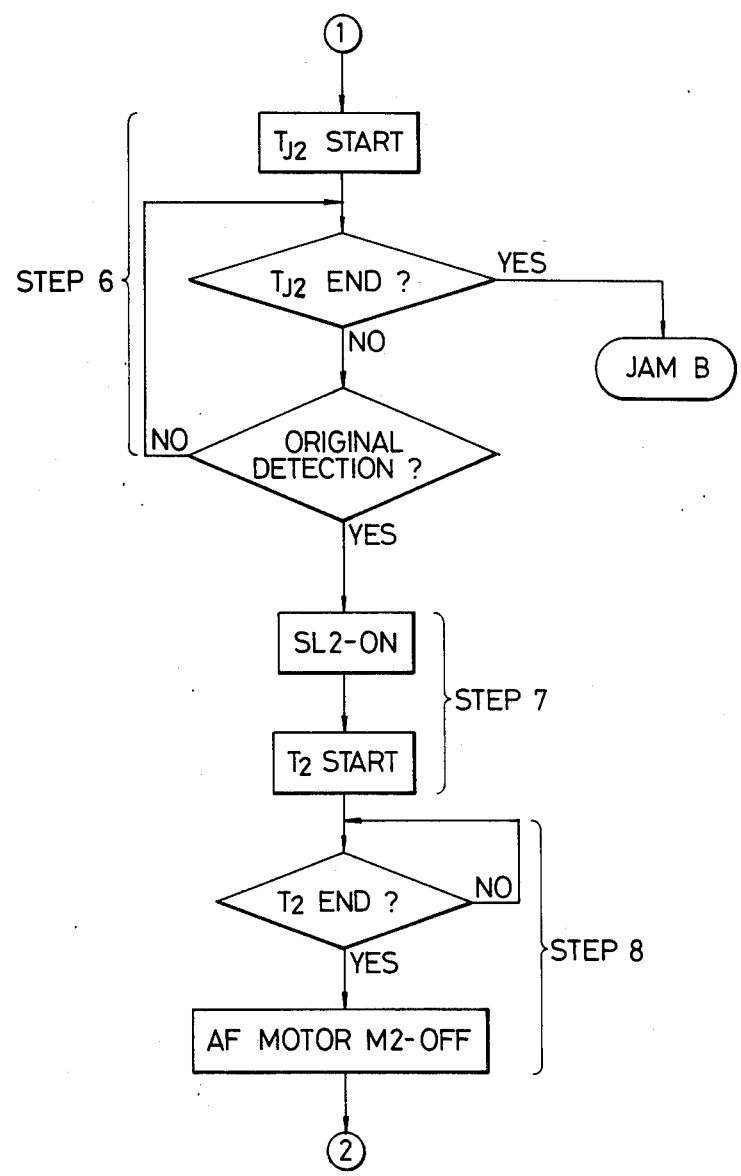

FIG. 6 shows the flow chart of a main routine. In a step 100, a jam state of the device is checked, and if it is not the jam state the switch 42 is checked in a step 101 to determine whether it is the ADF mode or the DF mode. If it is the ADF mode, an AF sub-routine shown in FIG. 7 is executed in a step 102. If it is the DF mode, the process goes to a step 103. In the step 103, a DF sub-routine shown in FIG. 8 is executed. In a step 104, the content of a timer to be described later is incremented by one. In a step 105, when the clock pulse is applied to the interrupt terminal INT, a content of a counter to be described later is incremented by one.

If the jam state is detected in the step 100. JAMA or JAMB shown in FIG. 9 is executed in a step 106 and the process goes to the step 104.

In the present embodiment, if a waiting state occurs during the execution of the AF sub-routine or the DF sub-routine, the process returns to the main routine.

The AF sub-routine is now explained with reference to FIG. 7. In a step 1, the input port $P_0$ is read to check if the original documents are stacked on the original document stack tray 1 and the AF original document sensor 9 detects them, and the input port $P_0$ is repeatedly watched until the original documents are detected. When the original documents are stacked, the process goes to a step 2 where the input port $P_5$ is read to check whether the start switch 39 is on, and it is repeatedly watched until the start switch 39 is turned on. When it is turned on, the lamp turn-on signal is produced from the output port $F_0$. Thus, the lamp 41 is lit to inform to the operator that the ADF operation has been started.

In a step 3, the pickup solenoid 11 is energized and the belt open solenoid 12 is deenergized by the signals from the output ports $F_1$ and $F_2$. Thus, the feed of the original document is started. A pick-up hold timer $T_1$ stored in a predetermined area of the RAM of the $\mu$ COM 43 is started to count for a predetermined time period. In a step 4, when the timer $T_1$ times out, the AF drive motor 13 is energized. The timer $T_1$ determines an interval from a time point when the pickup roller 2 falls by its gravity as a result of the energization of the pickup solenoid 11 and is pressed to the original document to a time point when the AF motor 13 is energized to feed the original document. If the timer $T_1$ is not provided, the original document is fed immediately when the pickup roller 2 falls on the original document resulting in trouble such as skew or double feed. At the end of the timer $T_1$, a pickup delay jam timer $T_{J1}$ is started.

In a step 5, the AF timing sensor 10 is monitored until the timer $T_{J1}$ is timed out. If the AF timing sensor 10 does not detects the original document before the timer $T_{J1}$ times out, it is regarded as mispickup and the process goes to the JAMB routine. If the AF timing sensor 10 detects the original document, it is determined that the pickup operation is normal and the pickup solenoid 11 is deenergized to lift the pickup roller 2.

At the time when the original document is detected by the AF timing sensor 10, the original document has been fed into the clearance between the separation belt (upper) 3 and the separation belt (lower) 4 and is fed by the separation belt (upper) 3. Accordingly, the feed by the pickup roller 2 is not necessary. Thus, the pickup solenoid 11 is deenergized to move the pickup roller 2 away from the original document. The separation belt (lower) 4 serves to prevent the double feed of the original documents. Thus, the pickup roller 2 functions to feed the topmost one of the original documents, and if the double feed occurs, they are separated by the reverse feed by the separation belt (lower) 4. If the pickup roller 2 continues to feed the original document when it is separated by the separation belt (lower) 4, the separation will be impeded. Accordingly, the pickup roller 2 is moved away from the original document.

In a step 6, when the AF timing sensor 10 detects the original document, an AF jam timer $T_{J2}$ is started and the DF original document sensor 29 is monitored until the timer $T_{J2}$ times out. If the DF original document sensor 29 does not detect the original document before the timer $T_{J2}$ times out, it is regarded that misseparation has occurred and the original document has been jammed in the separation belts. Thus, the process goes to the JAMB routine. If the DF original document sensor 29 detects the original document, it is regarded that the separation is normal and the process goes to the next step.

In a step 7, when the DF original document sensor 29 detects the original document, the belt open solenoid 12 is energized to open the belt to stop the feed of the original document in the AF unit. As will be explained later, the control of the DF unit is started upon turn-on of the DF original document sensor 29. At the same time, a belt open timer $T_2$ is started. In a step 8, the time-out of the timer $T_2$ is checked. During this period, the AF drive motor 3 is rotated to open the separation belts. That is, the separation belt (lower) 4 is pushed down to create the clearance between the separation belts 3 and 4 to present the impedance to the feed by the DF unit. The timer $T_2$ is set to a sufficient time to carry out the separation belt opening operation. When the timer $T_2$ times out, the AF drive motor 13 is deenergized and the process goes to the next step. The AF unit is now in a waiting state and it waits until the AF mode command is set in a step 9. When it is set, the AF mode is started.

In a step 10, the AF mode command is reset and it is checked if the AF original document sensor 9 detects the original document, that is, if the next original document is on the original document stack tray 1. If the AF original document sensor 9 detects the original document, the process goes to the step 3. In the step 3, in order to close the separation belt (lower) 4 opened in the step 8, the belt open solenoid 12 is deenergized in the step 4 so that the separation belt (lower) 4 is lifted before the next original document reaches the separation belts to attain smooth feed of the next original document by the separation belts. If the AF original document sensor 9 does not detect the original document in the step 10, the belt open solenoid 12 is deenergized in a step 11 and the AF drive motor 13 which has been stopped is energized and the belt close timer $T_3$ is started. In a step 12, when the timer $T_3$ times out, the AF drive motor 13 is deenergized. As a result, the separation belt (lower) 4 is returned to the original position to close the separation belts. The AF mode terminates at this time, and when the DF mode terminates, that is, when the original document fed to the DF unit is properly mounted on the original document platen glass 37 and the copying machine completes a predetermined number of times of copying operations and the original document is ejected from the DF unit, the lamp 41 is turned off to inform to the operator the end of the ADF operation, and the process returns to START and waits in the step 1.

The DF sub-routine is now explained with reference to FIG. 8. In a step 14, the signal from the switch 42 is read into the input port $P_7$ to check if it is the ADF mode or the DF mode. If it is the DF mode, the input port $P_5$ is read to check if the DF mode switch 40 is on, and the input port $P_5$ is monitored until the switch 40 is turned on. When it is turned on, the lamp turn-on signal is produced from the output port $F_0$. As a result, the lamp 43 is lit to inform the DF mode to the operator. In a step 15, the input port $P_2$ is read to check if the DF original document sensor 29 detects the original document and the input port $P_2$ is monitored until the original document is detected.

In the ADF mode, the DF unit is started when the original document fed from the AF unit turns on the DF original document sensor 29, and in the DF mode the DF unit is started when the DF original sensor 29 is turned on by stacking the original document on the entry tray 50, and the original document press solenoid 32 is energized to press the leading edge of the original document. An original document press timer $T_5$ is started, and when it times out, it is checked if the DF start signal is present. The DF start signal is produced when the copy operation of the copying machine is completed. During other than the copy operation, it is always produced from the copying machine. When the DF start signal is applied, the copy start signal supplied from the output port $F_9$ to the copying machine is turned off. The DF drive motor 34 and the clutch 35 are energized so that the belt 23, the original document press roller 20 and the feed roller 21 are rotated to feed the original document. The clock synchronized with the feed speed 2 generated by the clock generator 33 and applied to the interrupt terminal INT of the $\mu$ COM 43 to increment counters arranged at predetermined areas of the RAM of the $\mu$ COM 43.

In a step 17, a feed delay jam counter CNJ1 is started and the entry sensor 30 is monitored to check if it detects the leading edge of the original document, until the counter CNJ1 times out. If the entry sensor 30 does not detect the original document before the counter CNJ1 times out, it is regarded as misfeed and the process goes to the JAMB routine. If the entry sensor 30 detects the leading edge of the original document, it is regarded that the feed is normal and the process goes to the next step.

When the entry sensor 30 detects the leading edge of the original document, the original document press solenoid 32 is deenergized in a step 18. At this time, the original document receives the feed force from the feed roller 21, and the press roller 20 is moved up to prevent impedance to the feed of the original document by the feed roller 21 and the belt 23.

In order to stop the original document at the predetermined position on the original document platen glaus, the original document set counter CN1 is started when the entry sensor 30 detects the leading edge of the original document.

In a step 19, the entry sensor 30 is monitored to check if it detects the trailing edge of the original document, until the counter CN1 times out, and if the entry sensor 30 detects it, that is, if the original document detection signal of the entry sensor 30 is turned off, the AF mode command is set to start the AF mode operation in the step 9 of the AF subroutine. Thus, the AF unit executes the step 9 and the subsequent steps and the feed of the next original document is started. When the counter CN1 times out, that is, when the original document reaches the predetermined position (exposure position) on the original document platen glass 32, the DF drive motor 34 and the clutch 35 are deenergized and the brake 36 is energized to stop the belt 23 in order to enhance the stop accuracy. At this time, the original document has not yet reached the DF unit. In a step 20, when the counter CN1 times out, it is checked if the original document sensor 29 and the entry sensor 30 detect the original document, and if they detect it, it is regarded as the feed jam and the process goes to the JAMA routine. If they do not detect it, the copy start signal is issued to the copying machine and the copying machine starts the copy operation.

In a step 21, a brake on timer $T_4$ is started, and when the timer $T_4$ times out, the brake 36 is deenergized.

In a step 22, it is checked if the DF start signal is applied or if the DF original document sensor 29 detects the original document fed from the AF unit. During this period, the copying machine carries out the copy operation for a preset number of copies. In the ADF mode, the next original document is fed from the AF unit, and in the DF mode, the next original document is set to the entry tray 50, and when the DF original document sensor 29 detects the original document, the process goes to a step 15, and when the DF start signal is applied the DF mode operation is started. If the next original document is not detected by the DF original document sensor 29, the process goes to a step 23 when the DF start signal is applied. The copy start signal is turned off and the DF drive motor 34 and the clutch 35 are energized to feed the original document from the original document platen glass 37 to the ejection path. The ejection delay jam counter CNJ2 is started. In a step 24, the ejection sensor 31 is monitored to check if it detects the leading edge of the original document, until the counter CNJ2 times out, and if the ejection sensor 31 does not detect it, it is regarded as the ejection delay jam and the process goes to the JAMB routine. If the ejection sensor 31 detects it, the process goes to the next step. In a step 25, the ejection jam counter CNJ3 is started and when it times out the process goes to the next step. The counter CNJ3 is set to provide a sufficient time from a time point when the ejection sensor 31 detects the leading edge of the original document to a time point when the trailing edge of the original document is ejected from the ejection roller (2) 27. In a step 26, when the counter CNJ3 times out, the ejection sensor 31 is checked to determine if the original document is present, and if it is present, it is regarded as the ejection jam and the process goes to the JAMA routine. If the original document is not present, it is regarded that the original document has been properly ejected and the DF drive motor 34 and the clutch 35 are deenergized and the process returns to the step 15.

Referring now to the flow chart of FIG. 9, the JAM routine is explained. In the JAMA routine, the DF jam is checked. In a step 27, all loads are stopped, the brake 36 is energized and the brake on timer $T_4$ is started. In a step 28, when the timer $T_4$ times out, the brake 36 is deenergized and the jam lamp 44 is lit in the ADF mode and the jam lamp 45 is lit in the DF mode. In this case, the original document is jammed at the ejection sensor 31, the entry sensor 30 or the DF original document sensor 29. When one of those sensors detects that the original document has been taken out in a step 29, the process goes to a step 32. By energizing the brake 36 while all loads are stopped, the jammed original document in the DF jam routine is stopped at the jammed position to prevent damage of the original document. If the brake 36 is not energized, the original document is moved by the inertia of the drive system and the original document is moved out of the sensor and the jam reset is carried out. Thus, in the present embodiment, the jam reset is effected only when the original document is taken out in order to prevent the jam reset by the inertia of the motor.

In the JAMB routine, the AF jam, the delay jam and the DF delay jam are checked. In the step 29, all loads are stopped and the jam lamp 44 is lit in the ADF mode and the jam lamp 45 is lit in the DF mode. In this case, since the original document is not present at the sensor, the DF unit is opened (MS(1) 38 is turned off) in a step 31, the original document is taken out and the DF unit is closed again (MS(1) 38 is turned on). Then, the process goes to a step 32.

In the step 32, it is checked if it is the ADF mode or the DF mode. If it is the ADF mode, all original documents are taken out of the original document stack tray 1 and if the AF original document sensor 9 detects no original document, the jam reset is effected and the jam lamp 44 is turned off. If it is the DF mode, the jam lamp 45 is turned off.

Thus, in the ADF mode, the jam reset is effected when the AF original document sensor 9 detects no original document after the jam. Accordingly, the jam reset is effected when the operator takes out the remaining original documents in order to realign the jammed original document and the remaining original documents.

In the present embodiment, the timers and the counters are software ones arranged in the predetermined areas of the RAM of the $\mu$ COM 43.

As described hereinabove, by adding the DF unit to the ADF unit and selecting the ADF mode, the ADF mode operation is attained without changing the construction of the DF unit. Thus, the DF mode and the ADF mode can be selectively used by one mode selection means and the construction of the device is simplified and the cost is reduced.

Since the feed speed of the DF unit which feeds the original document to the predetermined position is set to be higher than the feed speed of the AF unit which separates the original documents, the original document separation performance is enhanced and the original document feed performance is also enhanced.

Since the previous original document is fed to the predetermined position before the next original document is separated and fed to the DF unit, the next original document can be held upstream of the DF unit before it is fed into the DF unit.

By starting the feed of the holding original document to the predetermined position in response to the ejection of the previous original document, the loss time required for the exchange of the original documents can be reduced.

In the AF unit, the preseparation is carried out by feeding by the pickup means, the post separation is carried out by the separation means and the original document is detected in the separation means to disable the pickup means. Thus, if the double feed occurs, the original document separated by the separation means and to be returned to the original document stack means can be smoothly returned without being loaded and the positive document separation is attained.

When the jam is detected in the device, the feed unit is stopped and the brake is applied to remove the inertia. Accordingly, the jammed original document is not moved and the malfunction such as automatic reset is prevented.

Since the operation is restarted when no original document is detected in the stack. Therefore, in case of jam reset, the operator takes out the original documents from the stack and realign them with the jammed original document to restart the operation. Accordingly, the recurrence of misfeed such as skew, double feed or jam after the restart is prevented.

By arranging the original document detection means in the vicinity of the branch point of the ejection paths, the ejection of the original document is positively checked whatever path the original document presses. Thus, the construction of the device is simplified and the cost is reduced.

While the present invention has been described in conjunction with the handling of the original documents, it is not limited to it. The present invention can be applied to control the feed of sheet-like articles such as copy papers.

We claim:

1. A sheet handling device comprising:
   stack means for stacking sheets;
   first detection means for detecting the presence or absence of sheets in said stack means;
   feed means for feeding a sheet in said stack means to a predetermined position along a feed path;
   second detection means for detecting the presence or absence of sheets on said feed path;
   misfeed detection means for detecting misfeed of a sheet in accordance with an output of said second detection means; and
   control means for stopping said feed means in response to the detection of the misfeed of the sheet by said misfeed detection means and permitting said feed means to restart on conditions that said second detection means detects the absence of a sheet on said feed path and said first detection means detects the absence of a sheet in said stack means.

2. A sheet handling device according to claim 1 wherein said misfeed is a sheet jam.

3. A sheet handling device according to claim 2, wherein said jam is a squeeze jam in which a sheet is squeezed into said second detection means exceeding a first predetermined time.

4. A sheet handling device according to claim 1, wherein said control means permits said feed means to restart in the event that first, said second detection means detects the absence of a sheet on said feed path, and then said first detection means detects the absence of a sheet in said stack means.

5. A sheet handling device comprising:
   feed means for feeding a sheet to a predetermined position;
   misfeed detection means for detecting first and second misfeed of a sheet in a feed path in said feed means, said misfeed detection means including sheet detection means and detecting the misfeed of the sheet in accordance with an output of said sheet detection means;
   brake means for braking said feed means; and
   control means for causing said feed means to stop the operation when said misfeed detection means detects the first and second misfeed, and enabling said feed means to operate in accordance with the output of said sheet detection means after occurence of the first and second misfeed, said control means enabling said brake means to operate at the time of occurrence of the first misfeed, and disenabling said brake means to operate at the time of occurrence of the second misfeed.

6. A sheet handling device according to claim 5, wherein said first misfeed is a squeeze jam in which a sheet is squeezed into said sheet detection means exceeding a first predetermined time.

7. A sheet handling device according to claim 5, wherein said second misfeed is a delay jam in which a sheet does not reach said sheet detection means exceeding a second predetermined time.

8. An original document handling device comprising:
   separation means for separating original documents one by one at a first speed;

feed means for feeding an original document separated by said separation means to an exposure position at a second speed higher than said first speed and for delivering the original document from said exposure position after termination of an exposure;

detection means for detecting the original document in said feed means, said detection means being positioned upstream more than said exposure position with respect to the transporting direction of the original document; and control means for controlling said separation means in accordance with the output of said detection means so as to initiate the separating operation for the successive original document upon detection of a predetermined portion of the original document by said detection means before the original document reaches the exposure position.

9. An original handling device according to claim 8, wherein said predetermined portion is a trailing edge of the original document.

10. An original document handling device according to claim 8, wherein said control means further controls said feed means to stop the previous original document at said predetermined position in accordance with the output of said detection means.

11. An original document handling device according to claim 10, wherein the output of said detection means is produced in response to the detection of a leading edge of the original document.

12. An original document handling device according to claim 10, wherein the previous original document reaches said predetermined position before the next original document is fed from said separation means to said feed means.

13. An original document handling device according to claim 8, wherein said detection means is disposed at an entry of said feed means.

14. An original document handling device according to claim 13, wherein said feed means includes a first feed unit for feeding the original document to said predetermined position and a second feed unit for feeding the original document separated by said separation means to said first feed unit, and said detection means is disposed between said first feed unit and said second feed unit.

15. A sheet handling device comprising:

feed means for feeding a sheet to a predetermined position;

misfeed detection means for detecting first and second misfeed of a sheet in a feed path in said feed means, said misfeed detection means including sheet detection means and detecting the misfeed of the sheet in accordance with an output of said sheet detection means; and control means for stopping said feed means in response to the detection of the misfeed of the sheet by said misfeed detection means and permitting said feed means to restart under a predetermined condition, wherein said predetermined condition is differentiated between the time of occurrence of the first misfeed and the time of occurrence of the second misfeed.

16. A sheet handling device according to claim 15, wherein said first misfeed is a squeeze jam in which a sheet is squeezed into said sheet detection means exceeding a first predetermined time.

17. A sheet handling device according to claim 16, wherein said control means permits said feed means to restart on condition that said sheet detection means detects the absence of a sheet after occurrence of said squeeze jam.

18. A sheet handling device according to claim 15, wherein said second misfeed is a delay jam in which a sheet does not reach said sheet detection means exceeding a predetermined time.

19. A sheet handling device according to claim 18, wherein said feed means is able to open and shut with respect to said predetermined position, and said control means permits said feed means to restart on condition that the open and shut performance of said feed means is detected after occurrence of said delay jam.

* * * * *

UNITED STATES PATENT AND TRADEMARK OFFICE
CERTIFICATE OF CORRECTION

PATENT NO. : 4,775,139
DATED : October 4, 1988
INVENTOR(S) : TAKESHI HONJO, ET AL.

It is certified that error appears in the above-identified patent and that said Letters Patent is hereby corrected as shown below:

IN THE DRAWINGS:

Sheet 5, "BLAKE BK" should read --BRAKE BK--; and "JAM CAMP" should read --JAM LAMP--;

Sheet 14, "OPERATION COMMAN" should read --OPERATION COMMAND--;

Sheet 15, "BLAKE BK" should read --BRAKE BK--.

Column 1, line 57, "in" should read --In--;

line 63, "opertor" should read --operator--.

Column 2, line 8, "ejection" should read --ejection,--;

line 56, "FIG. 2—2" should read --FIG. 2-2--.

Column 3, line 13, "on" should read --or--;

line 19, "2—2" should read --2-2--;

line 29, "pickup" should read --pick up--;

line 51, "half revolution" should read --half-revolution--.

Column 4, line 49, "close" should read --closed--;

line 54, "FIG. 2—2" should read --FIG. 2-2--;

UNITED STATES PATENT AND TRADEMARK OFFICE
CERTIFICATE OF CORRECTION

PATENT NO. : 4,775,139
DATED : October 4, 1988
INVENTOR(S) : TAKESHI HONJO, ET AL.

It is certified that error appears in the above-identified patent and that said Letters Patent is hereby corrected as shown below:

Column 4, line 55, "FIGS. 2-1" should read --FIG. 2-1--;

line 59, "DE" should read --DF--.

Column 6, line 38, "$(M_1)$," should read --$(M_1)$ 34,--.

Column 7, line 37, "detects" should read --detect--.

Column 8, line 12, "motor 3" should read --motor 13--;

line 15, "present" should read --prevent--.

Column 9, line 15, "clock" should read --clock is--;

line 16, "feed speed 2" should read --feed speed roller 2--;

line 39, "glaus," should read --glass,--;

line 53, "glass 32," should read --glass 37,--.

Column 11, line 57, delete ". Therefore";

line 59, "realign" should read --realigns--;

line 66, "presses." should read --passes.--.

UNITED STATES PATENT AND TRADEMARK OFFICE
CERTIFICATE OF CORRECTION

PATENT NO. : 4,775,139
DATED : October 4, 1988
INVENTOR(S) : TAKESHI HONJO, ET AL.

It is certified that error appears in the above-identified patent and that said Letters Patent is hereby corrected as shown below:

<u>Column 12</u>, line 26, "claim 1" should read --claim 1,--;

line 52, "occurence" should read --occurrence--;

<u>Column 13</u>, line 18, "original handling" should read --original document handling--.

Signed and Sealed this

Twenty-eighth Day of March, 1989

Attest:

DONALD J. QUIGG

Attesting Officer        Commissioner of Patents and Trademarks